A. HOLT.
HOLDER FOR BRAKE BEAMS.
APPLICATION FILED OCT. 22, 1914.
1,129,094. Patented Feb. 23, 1915.
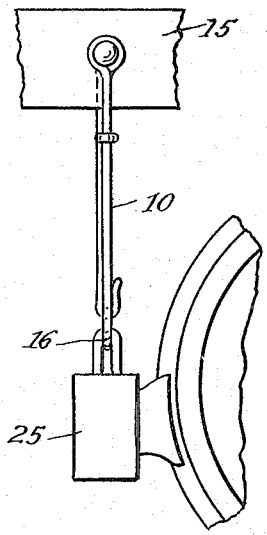
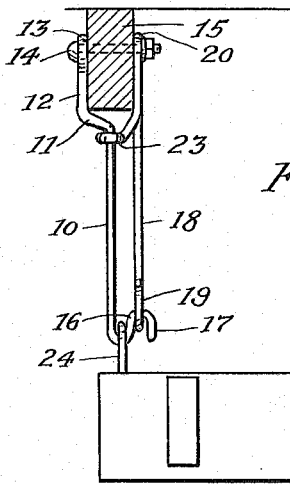
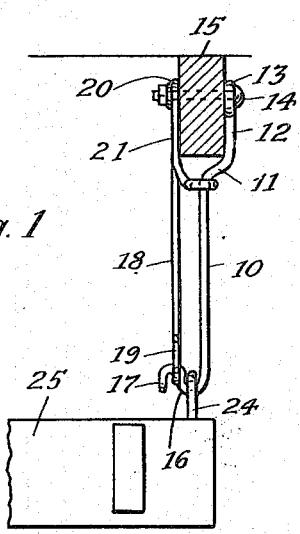
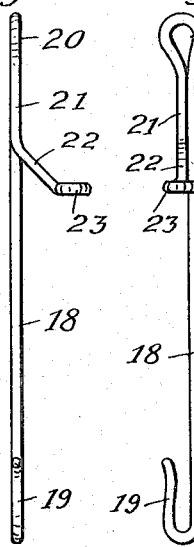
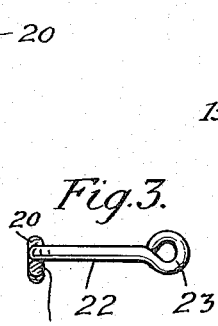
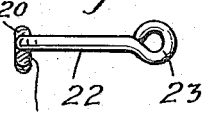
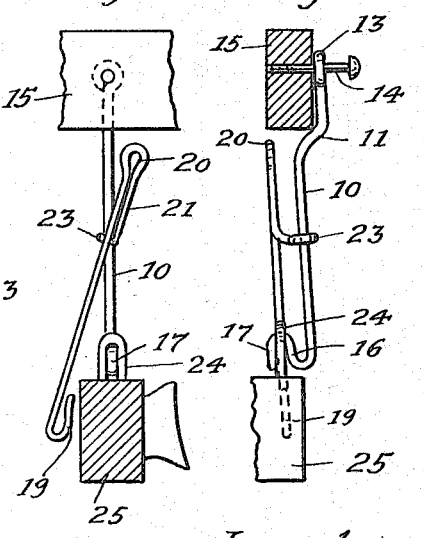
Witnesses:
H. A. Bowman.
Theo. Lagard.
Inventor:
August Holt.
By J. G. Whiteley
his Attorney.

UNITED STATES PATENT OFFICE.

AUGUST HOLT, OF MINNEAPOLIS, MINNESOTA.

HOLDER FOR BRAKE-BEAMS.

1,129,094.  Specification of Letters Patent.  Patented Feb. 23, 1915.

Application filed October 22, 1914. Serial No. 867,930.

*To all whom it may concern:*

Be it known that I, AUGUST HOLT, a citizen of the United States, residing at Minneapolis, in the county of Hennepin and State of Minnesota, have invented certain new and useful Improvements in Holders for Brake-Beams, of which the following is a specification.

My invention relates to holders for brake beams for locomotives, cars and other vehicles, and has for its object to provide a holder in which there shall be no welded member, and which will be easily assembled and efficient in use, which will not get out of repair or break readily, and which will provide a holder hook having a balanced support.

In the construction of my invention I provide a holder in which the side of the clevis is not welded to the shank of the hook member but is secured thereto by means of a loop, and the hook is additionally supported at its forward portion.

The full objects and advantages of my invention will appear in connection with the detailed description thereof and are particularly pointed out in the claims.

In the drawings, illustrating the application of my invention in one form,—Figure 1 is a side view of a brake beam secured by my improved brake beam holders, the main engine beams being shown in section. Fig. 2 is a side view of the parts shown in Fig. 1. Figs. 3, 4 and 5 are detail views of separate portions of the brake beam holder. Figs. 6 and 7 are side and end views of the brake beam holder showing the means of attaching the same to the engine beam.

My brake beam holder comprises a main hook shank 10 having an offset 11 and a portion 12 extending parallel with the shank 10, which is provided with an eye 13 for the reception of a bolt 14 which passes through the beam 15 of the engine or car. The shank 10 has at the bottom thereof an upwardly turned hook portion 16 and a downwardly turned hook portion 17. A separate piece 18 is provided which has a hooked lower end 19 adapted to engage within the hook 17 of the shank piece 10. The member 18 extends parallel with the shank 10 and is bent at its upward end to form an eye 20 which is secured by the bolt 14 to the beam 15. From the eye 20 the body of the member 18 is bent downwardly, as indicated at 21, and is provided with an offset portion 22 formed with a loop or eye 23 which surrounds the shank 10, and when the members are brought into operative position and secured by bolt 14 the loop 23 engages the shank 10 just below the offset 11, as clearly shown in Fig. 1.

The manner of assembling the device is best shown in Figs. 6 and 7. The loop 23 having been applied to the shank 10, the double hook portion 16, 17 of said shank is inserted through the loop support 24 of the brake beam 25, and the bolt 14 extended through the eye 13 and into aperture of the beam 15. The member 18 is then slid up along the shank 10 so that the hook 19 is caused to engage within the hook 17 and the eye 23 brought up against the offset portion 11, when the bolt 14 is extended through eye 20 and secured by a nut in the usual way.

The advantages of my invention will be apparent. The brake beam support is readily secured to the beam 15 at each side thereof, and the parts of the beam support are secured together by means of loops of the metal without the employment of any welded portions. Moreover, the hook 16 which forms the direct support for the brake beam is supported at each side of its connection with 24 by the shank 10 and the member 18, thus insuring the most effective possible support.

I claim:

1. In combination with an engine or car beam, a holder for brake beams comprising a hook member having an offset eye-piece, a separate eye-piece member having a loop surrounding the shank of the hook member adjacent said offset portion, and a bolt extending through said eye-piece and the engine beam for securing the hook member in position.

2. In combination with an engine or car beam, a holder for brake beams comprising a hook member having a hook end and an offset eye-piece, a separate eye-piece member having a loop surrounding the shank of the hook member adjacent said offset portion, and a bolt extending through said eye-piece and the engine beam for securing the hook member in position, said second named eye-piece having an extension removably connected with the hook end of the hook member.

3. In combination with the supporting beam of an engine or car, a holder for brake beams comprising a member having an offset eye-piece at one end and a reversely turned hook at the other end, a separate eye-piece member having a loop surrounding the shank of the hook member adjacent said offset portion and provided with a hooked extension removably connected with the outwardly turned portion of the reversely extended hook, and a bolt extending through said eye-piece and the engine beam for securing the hook member in position.

In testimony whereof I affix my signature in presence of two witnesses.

AUGUST HOLT.

Witnesses:
F. A. WHITELEY,
H. A. BOWMAN.

Copies of this patent may be obtained for five cents each, by addressing the "Commissioner of Patents, Washington, D. C."